Sept. 18, 1951 R. B. THARPE 2,568,134
WASHING MACHINE TRANSMISSION
Filed Oct. 23, 1947 2 Sheets-Sheet 1
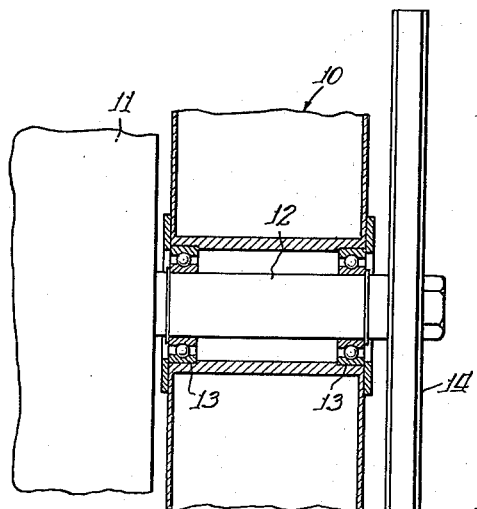
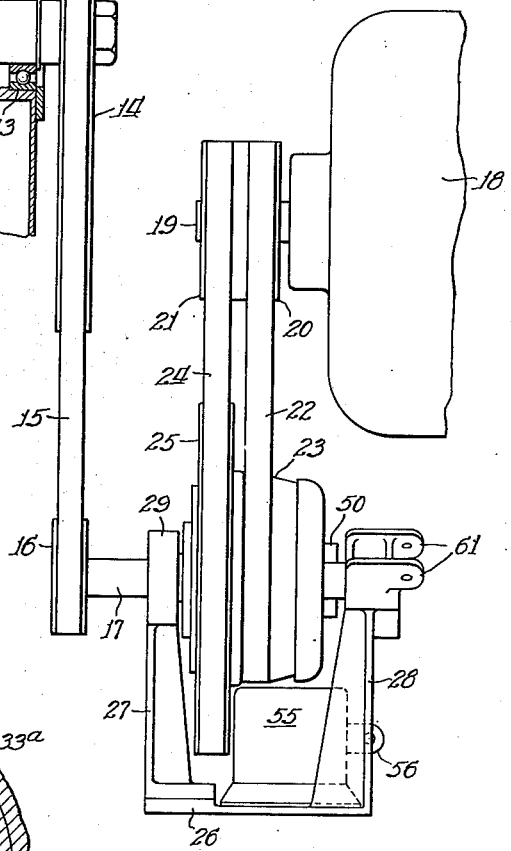
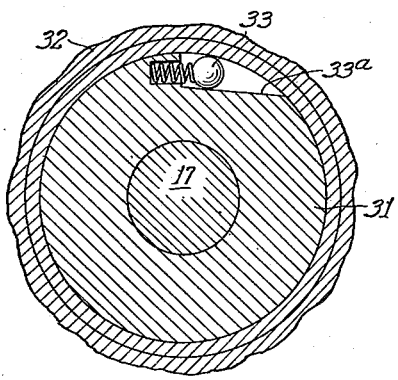
Inventor:
Rollin Bernard Tharpe

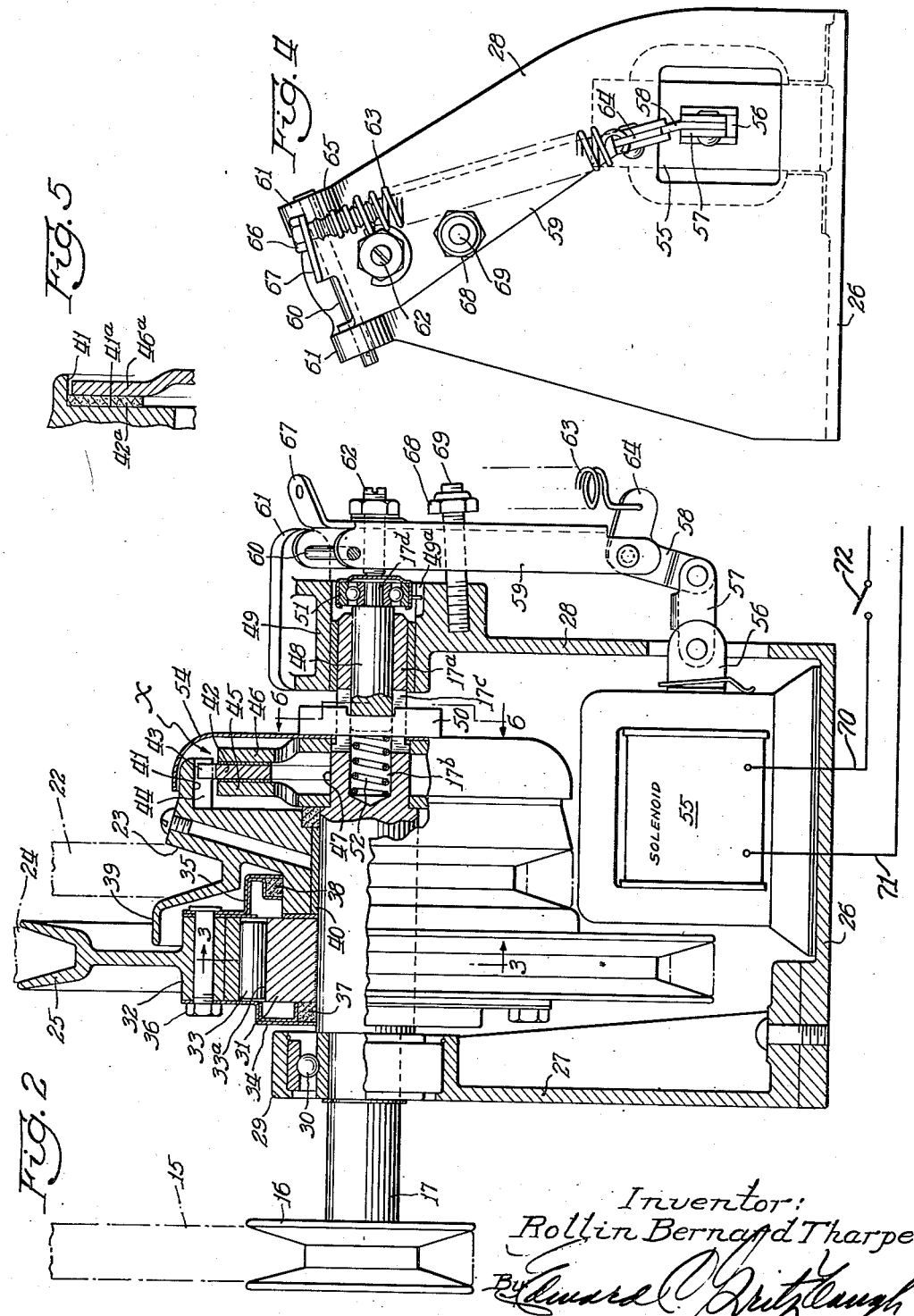

Patented Sept. 18, 1951

2,568,134

UNITED STATES PATENT OFFICE 2,568,134

WASHING MACHINE TRANSMISSION

Rollin Bernard Tharpe, Garrett, Ind., assignor to Borg-Warner Corporation, Chicago, Ill., a corporation of Illinois Application October 23, 1947, Serial No. 781,558

8 Claims. (Cl. 74—217)

The present invention relates to variable speed transmissions, and has more particular reference to a two-speed transmission assembly which may be operated for actuating a driven structure at selected or variable speeds.

The embodiment of the transmission contemplated herein, and disclosed in the drawings, is especially adapted for use for driving laundry apparatus and the like, such as a domestic washing machine, which is actuated at a low speed while performing the washing operation and is thereafter driven at an accelerated speed for wringing or drying the washed articles by centrifugal action.

It is one of the principal objects of this invention to simplify the construction of a variable speed transmission such as contemplated herein, and to improve the efficiency and operation of such transmission.

Another object hereof is to provide a simplified change-speed mechanism wherein the principal members of the assembly are mounted on or are carried by a single shaft which derives its power from a prime mover such as an electric motor or the like.

A further object is to provide a transmission mechanism wherein high speed and low speed pulleys are carried by a rotatable shaft, and are adapted to be alternately or selectively coupled to the shaft whereby said shaft will be intermittently rotated at two predetermined speeds.

Still another object resides in providing a novel two-speed transmission mechanism of a unitary character, wherein the high and low speeds are controlled through the instrumentalities of separate clutch devices, at least one of these clutch devices being of the over-running or one-way type.

Also, it is an object hereof to provide a variable speed transmission which is extremely compact in its over-all dimensions, while at the same time being quiet in performing its functions, and is effective in its manner of operation.

Another important object of this invention resides in the provision of a variable speed transmission wherein gears or gearing are entirely eliminated, and the arrangement of the parts effects an assembly which is of extremely compact form.

Additional objects, aims and advantages of the improvements contemplated herein will be apparent to persons skilled in the art after the construction and operation of the transmission assembly is understood from the within disclosure.

It is preferred to accomplish the numerous objects hereof, and to practice the invention, in substantially the manner hereinafter fully described and as more particularly pointed out in the appended claims. Reference is now made to the accompanying drawings forming a part of this specification.

In the drawings:

Fig. 1 is a graphic view showing a typical installation of the present invention.

Fig. 2 is a side elevation, partly in vertical axial section of the two-speed transmission which embodies the invention contemplated herein.

Fig. 3 is a transverse section taken along the plane of line 3—3 on Fig. 2, showing one of the clutches in detail.

Fig. 4 is an elevation looking at the right side of Fig. 2 showing details of the control assembly.

Fig. 5 is a fragmentary sectional view showing a simplified form of the friction clutch.

Fig. 6 is a transverse section taken along the plane of line 6—6 on Fig. 2.

The drawings are to be understood as being more or less of a diagrammatic character for the purpose of disclosing a typical or preferred form of the invention contemplated herein, and in these drawings like reference characters identify the same parts in the different views.

Referring first to Fig. 1, the washing machine, which is preferably of the horizontal type, comprises generally a housing 10 within which there is a reticulated basket 11 carried by a rotatable spindle 12, the latter being journaled in bearings 13 in a wall of housing 10 and projects therethrough with a pulley 14 secured to its end portion. Pulley 14 is driven by a belt 15 from a pulley 16 on a rotatable transmission shaft 17. This shaft has a flattened region 47 of double D-shape cross-section, and beyond this region said shaft has a reduced diameter as at 17a which is journaled in the bearing boss 49 at the top of pedestal or post 28. There is a central bore 17b in the transmission shaft, and said shaft is transversely slotted as at 17c, the purpose of which will be explained later herein.

There is a prime mover, such as an electric motor 18 having an armature shaft 19 on which a pair of pulleys 20 and 21 are anchored for rotation therewith. A belt 22 connects pulley 20 to a high-speed pulley 23, which latter is loosely carried by the transmission shaft 17. Similarly, the other motor pulley 21 is connected by a belt 24 to a low-speed pulley 25 which also is loosely carried by transmission shaft 17. Pulleys 20 and 21, for the purpose of economy in manufacture, may be of the same dimensions, and pulleys 23 and 25 being of different diameters, are thus adapted to drive the transmission shaft 17 at respectively high and low speeds, these speeds being effective respectively for the washing and the wringing operations which are performed by the washing machine. Such operations are controlled through by means of electro-mechanical devices which are preferably manually set for operation. It, of course, will be understood that only one operation is performed at a time, and this is accomplished by providing separate clutching means which drivingly connect the respective pulleys 23 and 25 to the transmission shaft 17.

The transmission assembly is preferably mounted in a supporting member comprising a base 26 having pedestals or posts 27 and 28 arising from the sides thereof, the pedestal 27 having the boss 29 at its upper end for seating a roller bearing 30 which journals transmission shaft 17 adjacent one end of the latter. A collar 31 is securely anchored to shaft 17 on the portion thereof which is adjacent bearing 30 and it will be seen that the hollow hub portion 32 of pulley 25 surrounds this collar 31. An overrunning clutch arrangement operatively connects pulley 25 to collar 31, said clutch comprising a spring-urged roller pin 33 loose in a seat or pocket 33a at the periphery of the collar 31.

Suitable sheet metal stampings 34 and 35, secured to pulley hub 32 by bolts 36, act as retainers for the roller pin 33, and there are also seals 37 and 38 arranged in the manner shown in Fig. 2. When the washing operation is being performed pulley 25 is driven at the desired low speed for such operation, and when the transmission has been shifted to another speed for the wringing operation the transmission shaft 17, rotates at a high speed and overruns pulley 25.

The high speed pulley 23 has an annular axially flared flange portion 39, which, as seen in Fig. 2, overlies the hub of low-speed pulley 25 and the hub portion of pulley 23 has a bearing bushing 40 between it and the transmission shaft 17. The side of pulley 23 that is remote to the low speed pulley 25 is recessed as at 41 to receive the members of a friction clutch assembly X which comprises an annular friction plate 42, splined as at 43 on ribs 44 in recess 41 to allow axial movement of plate 42 during clutch engagement. A back plate 45 and a pressure plate 46 are arranged on opposite sides of friction plate 42. The plates have non-circular openings to receive the flattened portions 47 of transmission shaft 17, such arrangement permitting said plates 45 and 46 to be moved axially on said shaft. The friction clutch assembly just described may comprise a simplified form such as shown in Fig. 5 wherein the radial surface 41a of pulley recess 41 may have facing material 42a secured to it and adapted to be engaged by an axially shiftable pressure plate 46a similar to the pressure plate 46.

Means are provided for operating the friction clutch assembly X. Such means may take the form of an axially shiftable piston 48 slidable in bore 17b of shaft 17 and carries on its inner portion a cross-member such as a pin 50 operating in shaft slot 17c hereinbefore mentioned. A thrust bearing 51 is carried by a spindle-like end 17d of the transmission shaft and is guided by a slot 49a in bearing boss 49 as shown in Fig. 2. The cross pin 50 is adapted to be shifted in a direction to move the pressure plate 46 in an axial direction whereby to engage the friction clutch assembly. The pin and piston are normally urged away from the pressure plate 46 by a spring 52 which is seated in the bore 17b at the end of transmission shaft 17. A dished sheet metal shield 54 extends radially outward from shaft 17 with its rim portion overlying the hub of high-speed pulley 23 in the manner shown, thus preventing extraneous matter from reaching the friction clutch assembly.

The means for controlling the friction clutch assembly X is preferably electro-mechanical and comprises a solenoid 55 mounted on base 26 and having its reciprocable core 56 connected by a link 57 to one arm 58 of a bell-crank pivotally carried on the lower end of a second-class lever 59 having its upper end fulcrumed on a pin 60 carried by ears 61 on the adjacent portion of pedestal 28 as seen in Fig. 4. Lever 59 is conveniently made from a sheet metal stamping of approximately U-shape cross-section and adjacent its fulcrum end it carries a threaded bolt 62 secured by a lock nut to the web portion of lever 59 and arranged with its inner end in proximity to or contacting the thrust bearing 51 in the manner shown in Fig. 2. Conductors 70 and 71, leading from a suitable source of electricity, are connected to the solenoid 55 to form an electric circuit therethrough for energizing the same, said circuit being controlled by a suitable switch 72 which may be manually or automatically actuated. When solenoid is energized its armature 56 is drawn inwardly, as to the left in Fig. 2, thereby rocking bell-crank arm 58 and thus moving lever 59 to the left which causes the shifting of piston 48 and cross pin 50, thus engaging the friction clutch assembly X. A coil contraction spring 63 has its lower end connected to the second arm 64 of the bell crank, and the upper end of said spring has its convolutions reduced in diameter as at 65 to engage the threads of a tension adjusting screw 66, the shank of which passes through a lateral lip 67 on the adjacent portion of lever 59. By rotating screw 66, the tension of spring 63 is adjusted and regulates the pressure which is applied to the clutch plates of friction clutch assembly X. Outward swing of lever 59 is limited by stop 68 threaded on the end of a stud 69 that passes through a slot in lever 59 and is anchored at its inner end on pedestal 28.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. A two-speed transmission for washing machines and the like comprising, a washing machine spindle; a constant speed motor, and a pair of pulleys on the armature shaft thereof; a countershaft; belt and pulley means drivingly connecting said spindle and countershaft; a low speed pulley loosely carried by said countershaft; an overrunning clutch connection between said low speed pulley and said countershaft; a high speed pulley loosely mounted on said countershaft; belts drivingly connecting said motor pulleys respectively to said low speed and high speed pulleys; a friction clutch member rotatable with said high speed pulley; an axially shiftable clutch pressure member rotatable with said countershaft adapted to engage and disengage said friction member; axially reciprocable piston means for shifting said pressure member; a lever for moving said piston; a solenoid interposed in an electric circuit and having its core operatively connected to said lever for urging said piston means in a direction to effect engagement of said friction clutch members, thereby to couple said high speed pulley to said countershaft; and switch means in said circuit for controlling the energizing and deenergizing of said solenoid.

2. A two-speed transmission for washing machines and the like comprising, a washing machine spindle; a constant speed motor, and a pair of pulleys on the armature shaft thereof; a countershaft; belt and pulley means drivingly connecting said spindle and countershaft; a low speed pulley loosely carried by said countershaft; an overrunning clutch connection between said low speed pulley and said countershaft; a high speed pulley loosely mounted on said countershaft and having a recess in one side; belts drivingly connecting said motor pulleys respectively to said low speed and said high speed pulleys; a friction clutch member rotatable with said high speed pulley; an axially shiftable clutch pressure member rotatable with said countershaft adapted to engage and disengage said friction member; said clutch members being positioned in said high speed pulley recess; axially reciprocable piston means movable toward and away from the end of said countershaft; a thrust bearing carried by said piston means; a lever adapted for engagement with said thrust bearing; a solenoid interposed in an electric circuit and having its core operatively connected to said lever for urging said thrust bearing and piston means in a direction to effect engagement of said friction clutch members, thereby to couple said high speed pulley to said countershaft; and switch means in said circuit for controlling the energizing and deenergizing of said solenoid.

3. A two-speed transmission for washing machines and the like comprising a washing machine spindle; a constant speed motor, and a pair of pulleys on the armature shaft thereof; a countershaft; belt and pulley means drivingly connecting said spindle and countershaft; a low speed pulley loosely carried by said countershaft; an overrunning clutch connection between said low speed pulley and said countershaft; a high speed pulley loosely mounted on said countershaft; belts drivingly connecting said motor pulleys respectively to said low speed and said high speed pulleys; a friction clutch assembly on said countershaft alongside of and rotatable with said high speed pulley; axially reciprocable piston means for effecting engagement of said friction clutch assembly; a lever for operating said piston means; and a solenoid having its core operatively connected to said lever for imparting movement thereto.

4. A two-speed transmission for washing machines and the like comprising a washing machine spindle; a constant speed motor, and a pair of pulleys on the armature shaft thereof; a countershaft; belt and pulley means drivingly connecting said spindle and countershaft; a plurality of pulley and belt drive assemblies drivingly connecting the motor shaft and countershaft, one countershaft pulley being a high speed pulley, and the other countershaft pulley being a one-way low speed pulley; a friction clutch member rotatable with said high speed pulley; an axially shiftable clutch pressure member rotatable with said countershaft adapted to engage and disengage said friction member; axially reciprocable piston means reciprocal toward and away from the end of said countershaft; a thrust bearing carried by said piston means; a lever engageable with said thrust bearing to move said piston means; a solenoid interposed in an electric circuit and having its core operatively connected to said lever for urging said thrust bearing and piston means in a direction to effect engagement of said friction clutch members, thereby to couple said high speed pulley to said countershaft; and switch means in said circuit for controlling the energizing and deenergizing of said solenoid.

5. A two-speed drive for washing machines and the like comprising, a driven spindle shaft; a constant speed motor having a drive shaft; in combination with a transmission assembly remote to said constant speed motor, said assembly comprising a countershaft; a plurality of pulley and belt drive assemblies drivingly connecting said drive shaft and said countershaft, one of said countershaft pulleys being a high speed pulley; means defining a one-way drive connection between the other countershaft pulley and said countershaft; a friction clutch assembly having cooperative association with said high speed pulley for rotation therewith; mechanical means for controlling operation of said friction clutch assembly; a switch controlled solenoid interposed in an electric circuit the core of said solenoid being operatively connected to and adapted to actuate said mechanical means; and means defining a driving connection between said countershaft and said spindle shaft.

6. A two-speed transmission for washing machines and the like as defined in claim 5 wherein the driving connection between the countershaft and spindle shaft comprises pulleys on the respective shafts, and a belt reeved on said pulleys.

7. A two-speed transmission for washing machines and the like comprising a constant speed motor including a pair of drive pulleys; a countershaft adapted for rotation at different speeds and forming part of a transmission assembly which is independent of and spaced remote to said motor; separate high-speed and low-speed driven pulleys loosely carried by said countershaft; separate belts spanning the space between said motor and said countershaft and reeved on the respective motor pulleys and countershaft pulleys; a washing machine spindle spaced remotely from said countershaft and having a pulley; a drive pulley anchored on said countershaft; a belt spanning the space between said spindle and said countershaft and reeved on said spindle pulley and the drive pulley on said countershaft; separate clutch means independently establishing driving connections between said countershaft and the respective high-speed and low-speed pulleys, one of said clutch means being active while the other is inactive, whereby said countershaft may be alternately operated by either said high-speed pulley or said low-speed pulley; and mechanical means for effecting operation of the clutch means for said high speed pulley; and a solenoid interposed in an electric circuit and having its core operatively connected to and adapted to actuate said mechanical means.

8. A two-speed transmission for washing machines and the like comprising a constant speed motor including a pair of drive pulleys; a countershaft adapted for rotation at different speeds and forming part of a transmission assembly which is independent of and is spaced remote to said motor; a group of pulleys carried by said countershaft, the first pulley being fixed to said countershaft, the second pulley being a low speed pulley, and the third pulley being a low speed pulley; separate belts spanning the space between said motor and said countershaft and reeved on said respective motor pulleys and said high speed and low speed pulleys; a work operating spindle spaced remotely from said countershaft and having a pulley; a belt spanning the space between said spindle and said countershaft and reeved on said spindle pulley and said fixed drive pulley on said countershaft; two clutch means on said countershaft independently establishing driving connections between said countershaft and the respective high-speed and low-speed pulleys thereon, one of said clutch means being active while the other is inactive, whereby said countershaft is adapted to be alternately operated by either said high-speed pulley or said low-speed pulley; and mechanical means for effecting operation of the clutch means for said high speed pulley; a solenoid interposed in an electric circuit and having its core operatively connected to and adapted to actuate said mechanical means; and electric switch means in said circuit for controlling the operation of said solenoid core.

ROLLIN BERNARD THARPE.

REFERENCES CITED

The following references are of record in the file of this patent:

UNITED STATES PATENTS

| Number | Name | Date |
| --- | --- | --- |
| 1,983,827 | Winther et al. | Dec. 11, 1934 |
| 2,191,628 | Scott et al. | Feb. 27, 1940 |

FOREIGN PATENTS

| Number | Country | Date |
| --- | --- | --- |
| 291,378 | Great Britain | Mar. 21, 1929 |